March 7, 1950 R. E. SMITH 2,499,688
GREEN CORN PICKER

Filed Nov. 9, 1944 2 Sheets-Sheet 1

INVENTOR.
ROY E. SMITH
BY
J. Warren Kinney, Jr.
ATTORNEY

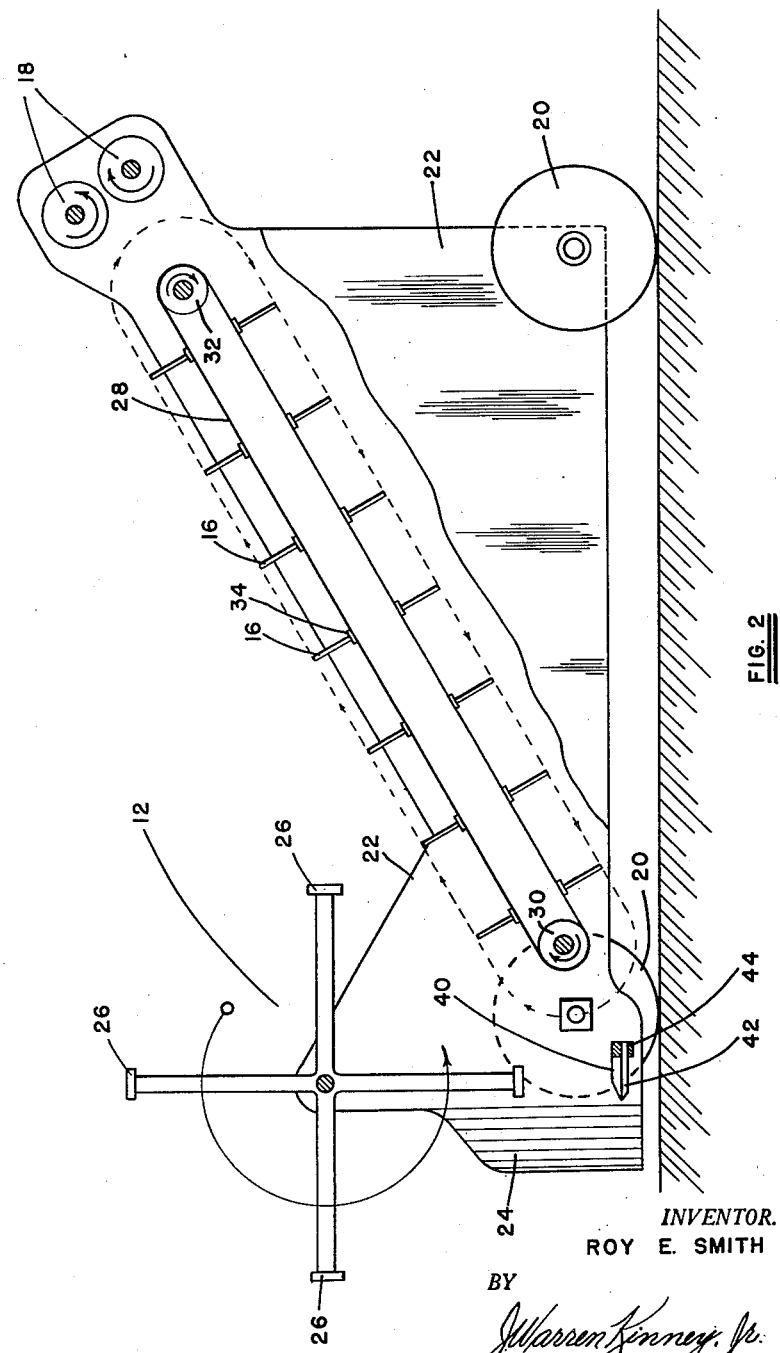

Patented Mar. 7, 1950

2,499,688

UNITED STATES PATENT OFFICE 2,499,688

GREEN CORN PICKER

Roy E. Smith, Warren County, Ohio, assignor of forty per cent to J. Warren Kinney, Jr., Cincinnati, Ohio Application November 9, 1944, Serial No. 562,689

6 Claims. (Cl. 56—103)

This invention relates to picking devices of the class known to the art as corn pickers, and more particularly to green corn and popcorn pickers.

An object of the present invention is to provide an automatic green corn picker which will sever ears of green corn, including the foliage surrounding the individual ears, from their respective corn stalks, without damaging the ear or bruising the kernels thereof.

Another object of the invention is to provide an automatic popcorn picker which will sever dried ears of popcorn from their respective stalks, without damaging the ear, or shelling the corn therefrom.

Still another object of the invention is to provide a corn picker which differs from the presently used corn pickers of the type which employ rollers for snapping ears of corn from their respective stalks, in that the present picker combs the ears from their stalks.

A further object of the invention is to provide a corn picker having the hereinabove described characteristics, which is structurally strong, mechanically simple and highly efficient.

These and other objects may be attained by the means described herein, and as disclosed in the accompanying drawing, in which:

Fig. 2 is a side view of the device of Fig. 1 with the side panel removed for clarity of detail and understanding.

Figure 1:
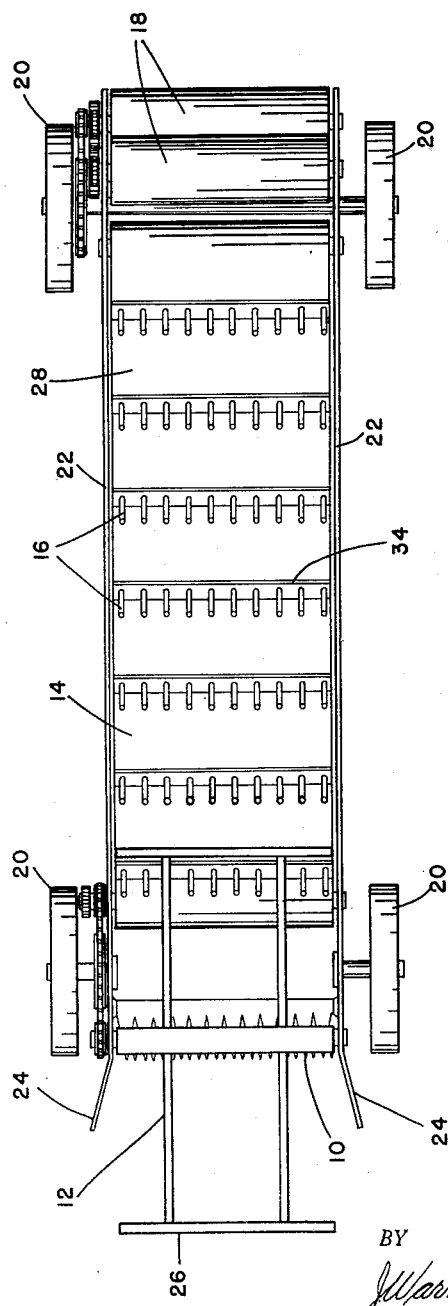
Fig. 1 is a top view of a corn picker embodying the present invention.

Heretofore ears of corn have been removed from their stalks by means of rollers between which the stalks were pulled for snapping the ears from their stalk; or the ears were removed by means of knives which would sever the ears from their stalks. Such devices have been quite satisfactory for processing dry field corn, however they cannot be used for harvesting green corn which is quite easily bruised and rendered unfit for its intended use by reason of such crushing.

The device of this invention differs from corn pickers heretofore used in that the ears are combed off of their stalks in such a manner as to avoid all injury to the tender juicy kernels of ears of green corn.

With reference to the figures, the device comprises, broadly speaking, a cutting member 10, a reel 12, an elevator 14 including comb-like fingers 16 and stalk engaging rollers 18.

For mobility, the device may be supported on wheels 20 which may be suitably secured to side panels 22, or other framework. The forward ends of these panels are provided with outwardly divergent gathering elements 24 which serve to guide the standing corn stalks into proper alignment with the cutting member and reel, as the device is moved forwardly down a row of standing corn.

The cutting element, which may comprise a stationary cutter member 40 and a movable cutter element 42 secured to and carried by a reciprocatable sickle bar 44, is adapted to sever the standing stalks whereupon cross arms 26 of reel 12 will then lay the severed stalks back onto elevator 14. The elevator may comprise an endless belt 28, the upper and lower ends of which pass over and are supported by rollers 30 and 32. A plurality of upstanding rigid finger members 16 are secured to and carried by belt 28. As illustrated in Fig. 1 these fingers are arranged in groups. If desired, each group of finger members may be secured to a base member 34, which may, in turn, be fastened to the belt.

For the purpose of illustrating a method of driving the mechanism, and solely by way of example, a sprocket 50 may be secured to and carried by a rotatably mounted shaft 51, which shaft may be driven by wheel 20. A sprocket chain 52 may engage sprocket 53 of reel 12 and sprocket 54 of stub shaft 55, to which shaft a gear 56 may also be secured so as to rotate with sprocket 54. Stub shaft 55 may be suitably journaled to side wall 22. Gear 56 engages gear 57 which is secured to and carried by shaft 58 to which lower roller 30 is secured.

Experiment has demonstrated that excellent results may be obtained when the finger members are about eight inches long and spaced about two inches apart on their respective base members. The spacing between the adjacent finger members of each group is determined by and is a function of the average stalk diameter of the corn to be harvested, being spaced apart by a dimension sufficient to freely accommodate a corn stalk. However, said fingers are spaced close enough so as to preclude an ear of corn from remaining in contact with its stalk. In other words, the fingers are adapted to be located between a stalk and its ears. In the event that an ear should tend to lie on top of its stalk the length of the fingers will cause the ears to fall to one side or the other of the fingers between which the stalk is located.

The primary function of reel 12 is to lay the severed corn stalks onto the elevator, with the tassel or top end uppermost and with the individual stalks disposed in substantial parallelism with the longitudinal axis of the elevator.

As the stalks are given a lineal motion toward rollers 18 the uppermost end thereof will be progressively fed into and between said rollers which are revolving at a rate of speed sufficient to impart a peripheral speed to the rollers which is substantially greater than the rate of lineal travel of elevator 14.

As the upper portion of the stalks are engaged by these rollers they will be suddenly pulled or accelerated forwardly, with the result that the stalks will be rapidly drawn through the finger members 16. Since the ears of corn are separated from their stalks by means of the finger members, the sudden acceleration of the stalks causes the ears to be neatly and cleanly severed from their stalks at the point of juncture where they are attached to their respective stalks.

If desired, rollers 18 may be positively and rapidly rotated by means of intermeshing gears 60 and 61, wherein gear 60 and sprocket 62 are mounted on the common drive shaft 66. A sprocket 64 may be secured to and carried by shaft 65, sprockets 62 and 64 being interconnected by means of a sprocket chain 63.

After having been thus severed from their stalks the ears of corn will fall over the uppermost edge of the upper reach of the endless belt or elevator, into a suitable bin 70.

The stalks having been pulled through or between rollers 18 may be discharged onto the ground, into a suitable receptacle or onto a conveyor, not illustrated.

It should be noted that the present invention is not concerned with nor is it directed or limited to any particular type or form of cutter member or reel, it being understood that any other devices having the desired functional results may be substituted for the devices illustrated. Nor is the present invention concerned with the particular power transmission means by which the cutter member, reel, elevator and rollers 18 are driven. These items may be driven from wheels 20, as generally illustrated in Fig. 1, or other suitable driving means may be employed.

What is claimed is:

1. In a corn picker, a stalk conveyor including outwardly projecting stalk engaging members mounted on said conveyor and constructed and arranged to receive stalks of corn between them and maintain the latter in substantial axial alignment with the direction of travel of said conveyor, said members spaced laterally apart by a dimension at least equal to the diameter of said stalks of corn adapted to be engaged between adjacent members with their ears disposed on the outside thereof, means for engaging said stalks after leaving said conveyor for pulling said stalks forwardly over said conveyor and between said projecting members for combing the ears downwardly from their respective stalks.

2. In a corn picker, a frame, a stalk conveying device carried by said frame, said stalk conveying device including an endless belt provided with a plurality of outwardly projecting members arranged in a plurality of laterally spaced transversely extending rows for receiving stalks between adjacent upwardly projecting members of said transverse rows, stalk engaging elements rotatably mounted to said frame and disposed beyond the discharge end of said conveying device and arranged to engage the stalks discharged from said conveyor, means for imparting a linear motion to said conveying device, and means for imparting a stalk accelerating motion to said stalk engaging elements for bodily pulling said stalks forwardly relative to said conveyor and between said projecting members for combing the ears from stalks disposed on said conveying device.

3. In a green corn picker, a frame, a stalk conveying device carried by said frame, said device comprising an endless belt having a plurality of outwardly projecting fingers arranged in a plurality of laterally spaced transversely extending rows for receiving stalks of green corn between adjacent fingers of said rows, stalk engaging elements secured to and carried by said frame and disposed adjacent the discharge end of said conveying device, said elements comprising a pair of rollers mounted to positively engage and pull forwardly stalks discharged from said conveying device, means for imparting a linear motion to said conveying device, and means for rotating said rollers at a rate of speed sufficient to pull said stalks forwardly relative to said conveyor and its associated fingers.

4. In a cornpicker, a stalk conveyor comprising an endless belt including a plurality of laterally spaced transversely extending rows of stalk engaging fingers secured to and projecting outwardly therefrom, the fingers of each transverse row being disposed in substantial axial alignment with those of the other rows and being spaced apart by a dimension sufficient to accommodate the diameter of a corn stalk between adjacent fingers, and for disposing the ears outwardly thereof, and means for imparting a forward motion to the upper end of stalks conveyed on said conveyor for moving said stalks forwardly relative to said fingers for severing the connection between said stalk and its ears.

5. In a cornpicker for green corn, a wheel borne frame including front and rear portions, a stalk severing device secured to and carried by the front portion, a reel secured to and carried by said front portion and disposed above said stalk severing device, a stalk conveyor carried by said frame and extending intermediate said front and rear portions, said conveyor comprising an endless belt having a plurality of laterally spaced transversely extending rows of finger members projecting outwardly therefrom, the finger members of each row being disposed in substantial axial alignment with similar members of other rows, the adjacent members of each row being spaced apart by a dimension to freely accommodate the diameter of a stalk of corn laid lengthwise therebetween, the overall height of said members being of a dimension approximating four (4) times the spacing between the adjacent members of a row, a pair of stalk engaging rollers secured to and carried by the rear portion of said frame and adjacent the discharge end of said conveyor, means operable for driving said stalk severing device and reel, and for imparting a linear motion to said endless belt, and means operable for rotating said stalk engaging rollers at peripheral speeds in excess of the linear speed of said endless belt.

6. A green cornpicker comprising, in combination, a wheel borne frame including a front portion and an elevated rear portion, means secured to and carried by said front portion for cutting stalks of standing corn, a stalk conveyor carried by said frame and extending between said front and rear portions, said conveyor comprising an endless belt having a plurality of laterally spaced transversely extending rows of finger members projecting outwardly therefrom, wherein the finger members of each row are disposed in substantial axial alignment with similar members of other rows, and wherein the adjacent members of each row are spaced apart by a dimension to freely accommodate the diameter of a stalk of corn laid lengthwise therebetween, means secured to and carried by the front of said frame and disposed above said stalk cutting means for laying the severed stalks upon said conveyor with their tassel ends uppermost, means secured to and carried by the rear portion of said frame and adjacent the discharge end of said conveyor for receiving and positively engaging the stalks, tassel end first, as they leave said conveyor for pulling said stalks forwardly relative to said conveyor and between said upstanding fingers for combing the ears from said stalks, and means operable for driving said above mentioned means and said conveyor.

ROY E. SMITH.

REFERENCES CITED

The following references are of record in the file of this patent:

UNITED STATES PATENTS

| Number | Name | Date |
| --- | --- | --- |
| 308,691 | Norton | Dec. 2, 1884 |
| 397,656 | McKivett | Feb. 12, 1889 |
| 1,821,374 | Bogatz | Sept. 1, 1931 |